(12) United States Patent
Konishi et al.

(10) Patent No.: US 9,257,239 B2
(45) Date of Patent: Feb. 9, 2016

(54) BINDER COMPOSITION FOR ELECTRODE

(71) Applicants: DENKI KAGAKU KOGYO KABUSHIKI KAISHA, Tokyo (JP); SEI CORPORATION, Tsu-shi, Mie (JP)

(72) Inventors: Hironori Konishi, Ichihara (JP); Daisuke Shimiya, Ichihara (JP); Kazuhiro Kote, Ichihara (JP); Takehiko Sawai, Tsu (JP); Shinji Saito, Tsu (JP); Jun Nakagawa, Tsu (JP)

(73) Assignees: DENKA COMPANY LIMITED, Tokyo (JP); SEI CORPORATION, Tsu-Shi (JP)

( * ) Notice: Subject to any disclaimer, the term of this patent is extended or adjusted under 35 U.S.C. 154(b) by 0 days.

(21) Appl. No.: 14/356,823

(22) PCT Filed: Nov. 2, 2012

(86) PCT No.: PCT/JP2012/078431
§ 371 (c)(1),
(2) Date: May 7, 2014

(87) PCT Pub. No.: WO2013/069558
PCT Pub. Date: May 16, 2013

(65) Prior Publication Data
US 2014/0307364 A1    Oct. 16, 2014

(30) Foreign Application Priority Data

Nov. 7, 2011    (JP) .................................. 2011-243439

(51) Int. Cl.
*H01M 4/62*    (2006.01)
*H01G 11/38*    (2013.01)
*H01G 11/30*    (2013.01)
*C08L 33/02*    (2006.01)
*C08L 47/00*    (2006.01)
*C08L 33/06*    (2006.01)
*C08L 33/14*    (2006.01)
*H01M 10/0525*    (2010.01)

(52) U.S. Cl.
CPC ............ *H01G 11/38* (2013.01); *H01G 11/30* (2013.01); *H01M 4/622* (2013.01); *C08L 33/02* (2013.01); *C08L 33/066* (2013.01); *C08L 33/14* (2013.01); *C08L 47/00* (2013.01); *C08L 2203/02* (2013.01); *H01M 10/0525* (2013.01); *Y02E 60/13* (2013.01)

(58) Field of Classification Search
None
See application file for complete search history.

(56) References Cited

U.S. PATENT DOCUMENTS

| | | | | |
|---|---|---|---|---|
| 5,075,164 A | * | 12/1991 | Bowman et al. | 428/325 |
| 5,405,907 A | * | 4/1995 | Bowman et al. | 524/446 |
| 6,376,570 B1 | * | 4/2002 | Zhao et al. | 522/42 |
| 6,756,153 B1 | | 6/2004 | Yamamoto et al. | 429/217 |
| 2002/0034686 A1 | | 3/2002 | Yamakawa et al. | 429/217 |
| 2004/0020763 A1 | | 2/2004 | Kanzaki et al. | 204/250 |
| 2009/0239147 A1 | | 9/2009 | Itou et al. | 429/217 |
| 2009/0280409 A1 | | 11/2009 | Mogi et al. | 429/217 |
| 2012/0189898 A1 | | 7/2012 | Wakizaka et al. | 429/144 |

FOREIGN PATENT DOCUMENTS

| | | |
|---|---|---|
| JP | 2000-294230 A | 10/2000 |
| JP | 2002-110169 A | 4/2002 |
| JP | 2004-134365 A | 4/2004 |
| JP | 2011-49177 A | 3/2011 |
| JP | 2011-154981 A | 8/2011 |
| WO | WO 2007/072948 A1 | 6/2007 |
| WO | WO 2011/024789 A1 | 3/2011 |
| WO | WO 2011/040474 A1 | 4/2011 |

OTHER PUBLICATIONS

International Search Report mailed Feb. 12, 2013, issued in corresponding International Application No. PCT/JP2012/078431.

* cited by examiner

*Primary Examiner* — Satya Sastri
(74) *Attorney, Agent, or Firm* — Stein IP, LLC

(57) ABSTRACT

An object of the invention is to provide an electrode material slurry for preparation of lithium-ion secondary batteries favorable in properties and superior in storage stability and an aqueous binder composition for lithium-ion secondary batteries that can be used for production of lithium-ion secondary batteries superior in discharge rate characteristics and cycle characteristics.

Provided is a binder composition for lithium-ion secondary battery electrode, comprising polymer particles containing (a) an ethylenic unsaturated carboxylic ester compound and (b) an ethylenic unsaturated sulfonic acid compound at a (a)/(b) mass ratio of (98 to 91)/(2 to 9) in a total (a) and (b) amount of 70 mass % or more, based on the monomeric raw materials.

8 Claims, No Drawings

BINDER COMPOSITION FOR ELECTRODE

CROSS-REFERENCE TO RELATED APPLICATIONS

This application is a national phase of International Application No. PCT/JP2012/078431, filed Nov. 2, 2012, which claims the benefit of Japanese Application No. 2011-243439, filed Nov. 7, 2011, in the Japanese Patent Office. All disclosures of the document(s) named above are incorporated herein by reference.

BACKGROUND OF THE INVENTION

1. Field of the Invention

The present invention relates to a binder composition for electrode, a slurry for electrode containing the binder composition, and an electrode, a secondary battery, and others prepared by using the same.

2. Description of the Related Art

Devices reusable after recharging, for example secondary batteries such as lithium-ion secondary battery, nickel metal-hydride secondary battery, and nickel cadmium secondary battery and capacitors such as electric double-layer capacitor, have been used recently in electronic devices.

These secondary batteries and capacitors generally contain electrodes, a separator, and an electrolyte solution containing electrolytes. The electrodes are prepared as a mixture layer by coating and drying an electrode material slurry containing an electrode active material dispersed in a solvent containing a resin binder dissolved therein on an electrode current collector.

Polyvinylidene fluoride (hereinafter, referred to as PVDF), which has been frequently used industrially as a resin binder for lithium-ion secondary battery electrodes, cannot satisfy the requirements for high-performance batteries at the level demanded recently.

For example when PVDF is used as a binder, as disclosed in Patent Document 1, a nitrogen-containing organic solvent, for example an amide such as N-methylpyrrolidone (hereinafter, NMP) or a urea, is used as the solvent used in production of the mixture layer. However, the nitrogen-containing organic solvent such as NMP should be recovered, because release to the environment of the solvent vapor formed during the drying step causes an environmental problem.

Accordingly, proposed was use of an aqueous binder as the resin binder. For example, Patent Document 2 discloses a negative-electrode mixture paste prepared by dispersing a carbon material (as negative-electrode active material) and an aqueous mixture of an aqueous emulsion of acrylic copolymer and carboxymethylcellulose (as binder) in a solvent water.

However, conventional aqueous binders have been used mainly on negative electrode plates. They had a problem that they were less suited for coating on positive electrode plates, particularly because of insufficient dispersibility of the coating slurry in the electrode plate-producing process, and did not give batteries with sufficient performance.

Particularly recently, demand for improvement in performance of batteries lead to modification of electrode active substances, and there also exists currently a need for improvement in performance of the binder.

CITATION LIST

Patent Literatures

[Patent Document 1] JP-A No. 2004-134365
[Patent Document 2] JP-A No. 2000-294230

SUMMARY OF THE INVENTION

Technical Problem

An object of the present invention, which was made to solve the problems above and under the circumstances above, is to provide a binder composition for electrode more favorable in properties and superior in storage stability.

Solution to Problem

The present invention, which was made to solve the problems above, is an invention having the following aspects [1] to [16].

[1] A binder composition for electrode, comprising polymer particles containing (a) an ethylenic unsaturated carboxylic ester compound and (b) an ethylenic unsaturated sulfonic acid compound at a (a)/(b) mass ratio of (98 to 91)/(2 to 9) in a total (a) and (b) amount of 70 mass % or more, based on the monomeric raw materials.

[2] The binder composition for electrode described in aspect [1], wherein the ethylenic unsaturated carboxylic ester compound (a) is one or more compounds selected from (a1) ethylenic unsaturated carboxylic ester compounds having one or more hydroxyl groups in the alcohol region; (a2) ethylenic unsaturated carboxylic ester compounds having multiple (meth)acrylic groups and/or (meth)allylic groups; and (a3) ethylenic unsaturated carboxylic ester compounds having an alkyl group having a carbon number of 8 or more in the alcohol region.

[3] The binder composition for electrode described in aspect [1] or [2], wherein the ethylenic unsaturated carboxylic ester compound (a) contains an ethylenic unsaturated carboxylic ester compound having one or more hydroxyl groups in the alcohol region (a1) and the content of the compound (a1) is 1 to 9 mass %.

[4] The binder composition for electrode described in any one of aspects [1] to [3], wherein the ethylenic unsaturated carboxylic ester compound (a) contains an ethylenic unsaturated carboxylic ester compound having multiple (meth)acrylic groups and/or (meth)allylic groups (a2) and the content of the compound (a2) is 1 to 10 mass %.

[5] The binder composition for electrode described in any one of aspects [1] to [4], wherein the ethylenic unsaturated carboxylic ester compound (a) contains an ethylenic unsaturated carboxylic ester compound having an alkyl group having a carbon number of 8 or more in the alcohol region (a3) and the content of the compound (a3) is 10 to 98 mass %.

[6] The binder composition for electrode described in any one of aspects [2] to [5], wherein the ethylenic unsaturated carboxylic ester compound (a) contains additionally (a4) an ethylenic unsaturated carboxylic ester compound having an alkyl group having 1 to 7 carbon atoms in the alcohol region and the content of the (a4) is 1 to 30 mass %.

[7] The binder composition for electrode described in any one of aspects [1] to [6], further comprising (c) an ethylenic unsaturated carboxylic acid, wherein the content of the ethylenic unsaturated carboxylic acid is 0.1 to 1.0 mass %.

[8] An electrode material slurry, comprising the binder composition for electrode described in any one of aspects [1] to [7] and an active material.

[9] An electrode material slurry, comprising a composite material of the binder composition for electrode described in any one of aspects [1] to [7], an active material, and a conductive assistant.

[10] The electrode material slurry described in aspect [8] or [9], wherein the active material is a positive-electrode active material, which is one or more compounds selected from olivine-type lithium compounds and mixed lithium metal oxides such as lithium cobaltate, lithium manganate, and lithium nickelate.

[11] The electrode material slurry described in aspect [9], wherein: the composite material is a mixture of the active material and the conductive assistant or the compound thereof in which they are connected to each other between the carbon atoms; the active material contains a powder of an olivine-type lithium compound (for example, lithium iron phosphate, lithium manganese phosphate, or the mixed compound thereof); and the conductive assistant contains acetylene black and/or carbon nanotube.

[12] The electrode material slurry described in aspect [8] or [9], wherein: the active material is a negative-electrode active material, which is one or more materials selected from negative-electrode carbon materials, negative-electrode silicon oxide (SiOx) materials, negative-electrode alloy materials, and negative-electrode tin oxide materials.

[13] The electrode material slurry described in aspect [8], wherein the active material is activated carbon.

[14] An electrode produced by using the electrode material slurry described in any one of aspects [8] to [13].

[15] A secondary battery produced by using the electrode described in aspect [14].

[16] An electric double-layer capacitor produced by using the electrode described in aspect [14].

Additional aspects and/or advantages of the invention will be set forth in part in the description which follows and, in part, will be obvious from the description, or may be learned by practice of the invention.

Advantageous Effects of Invention

The binder composition for electrode according to the present invention gives an aqueous slurry for electrode superior in properties and storage stability.

DETAILED DESCRIPTION OF THE EMBODIMENTS

1. Binder Composition

The binder composition for electrode according to the present invention (hereinafter, referred to simply as "binder composition") comprises polymer particles containing (a) an ethylenic unsaturated carboxylic ester compound and (b) an ethylenic unsaturated sulfonic acid compound at a (a)/(b) mass ratio of (98 to 91)/(2 to 9). The binder composition according to the present invention comprises the polymer particles containing (a) and (b) in a total amount of 70 mass % based on the monomeric raw materials.

When the (a)/(b) mass ratio is in the range of (98 to 91)/(2 to 9), the electrode material slurry prepared from the binder composition according to the present invention shows very favorable storage stability. When the ratio is not within the range above, the electrode material slurry has unfavorable storage stability, making it difficult to give an electrode to obtain a lithium-ion secondary battery superior in discharge rate and cycle characteristics.

In addition, the binder composition according to the present invention, which contains the compounds (a) and (b) as the major components, gives an electrode material slurry with favorable storage stability and thus a coated film with favorable smoothness.

It is possible, by using an electrode material slurry containing the binder composition according to the present invention and by forming a mixture layer by coating the electrode material slurry on a current collector, to obtain an electrode carrying a mixture layer superior in properties such as adhesiveness and pencil hardness. It is also possible by using the electrode to obtain a lithium-ion secondary battery, a nickel metal-hydride secondary battery, an electric double-layer capacitor, or the like superior in discharge rate and cycle characteristics.

In contrast, traditional aqueous binder compositions were less easily applicable to electrode plate-producing process and give a product with insufficient electronic performance, although they satisfy the requirements in toxicity and recovery cost for the electrode plate-producing process. The binder composition according to the present invention, when used, can overcome such problems and such an aqueous binder composition is demanded urgently in the industry and has great industrial applicability.

(1) Monomeric Raw Material

The ethylenic unsaturated carboxylic ester compound (a) is not particularly limited.

The ethylenic unsaturated carboxylic ester compound can be prepared by a method known in the art from an ethylenic unsaturated carboxylic acid and a (mono-or di-)alcohol and the ester compound has an ethylenic unsaturated carboxylic acid region and an alcohol region. The ester compound for use may be a compound thus prepared or a commercially available compound.

Examples of the ethylenic unsaturated carboxylic ester compounds include various (meth)acrylic esters and (meth)allylic esters. The terms "(meth)acrylic" and "(meth)allylic" mean both "acrylic and methacrylic" and both "allylic and methallylic" respectively.

The ethylenic unsaturated carboxylic ester compounds (a) is preferably one of the following compounds (a1) to (a4): Specifically, the ethylenic unsaturated carboxylic ester compound (a) is, for example, one or more compounds selected from (a1) ethylenic unsaturated carboxylic ester compounds having one or more hydroxyl groups in the alcohol region, (a2) ethylenic unsaturated carboxylic ester compounds having more than one (meth)acrylic groups and/or (meth)allylic groups, or (a3) ethylenic unsaturated carboxylic ester compounds having an alkyl group having a carbon number of 8 or more in the alcohol region. A combination of the compounds (a1), (a2), and (a3) is also favorable.

The alkyl group in the ethylenic unsaturated carboxylic ester compound having a "hydroxyl group-containing alkyl group" in the alcohol region (a1) is preferably a linear or branched hydrocarbon group, more preferably a linear hydrocarbon group.

The number of the carbons in the alkyl group is preferably 1 to 8, more preferably, 1 to 3. The number of the hydroxyl groups is not particularly limited, but preferably 1 or 2. The ethylenic unsaturated carboxylic acid region is preferably methacrylic acid.

Typical examples of the compounds (a1) include 2-hydroxyethyl(meth)acrylate, 2-hydroxypropyl(meth)acrylate, 3-hydroxypropyl(meth)acrylate, 4-hydroxybutyl(meth)acrylate, hydroxycyclohexyl(meth)acrylate, and the like. In particular, 2-hydroxyethyl methacrylate and 4-hydroxybutyl acrylate are preferable.

The compounds (a1) exemplified above may be used alone or as a mixture of two or more.

The content of the compound (a1) is preferably 1 to 15 mass %, more preferably 1 to 9 mass %, and particularly 3 to 8 mass %, based on the total amount of the raw material monomers.

The ethylenic unsaturated carboxylic ester compound having multiple (favorably two) "(meth)acrylic groups and/or (meth)allylic groups" (a2) is not particularly limited. The compound (a2) can be shown, for example, by "(meth)acrylic groups and/or (meth)allylic groups" —O— "alkylene group-O"$_n$— "(meth)acrylic groups and/or (meth)allylic groups."

The "alkylene group" in the alcohol region of "alkylene group-O" is preferably a linear or branched hydrocarbon group, more preferably a linear hydrocarbon group. The carbon number of the "alkylene group" is preferably 1 to 5, more preferably 1 or 2.

n is preferably an integer of 0 to 4, more preferably of 0 to 2, and particularly preferably of 0 or 1.

Typical examples of the compounds (a2) include (meth)allyl(meth)acrylate, ethylene glycol di(meth)acrylate (e.g., ethylene glycol dimethacrylate), propylene glycol di(meth)acrylate, tetramethylene glycol di(meth)acrylate, 1,3-butylene glycol dimethacrylate, and the like. In particular, allyl methacrylate, ethylene glycol dimethacrylate, and the like are preferable.

The compounds (a2) exemplified above may be used alone or as a mixture of two or more.

The content of the compound (a2) is preferably 1 to 15 mass %, more preferably 1 to 10 mass %, and particularly preferably 1 to 7 mass %, based on the total amount of the raw material monomers.

The ethylenic unsaturated carboxylic ester compound having "an alkyl group having a carbon number of 8 or more" in the alcohol region (a3) is preferably the compound in which the alkyl group has a carbon number of preferably 8 to 18, more preferably 8 to 12, and still more preferably 8 to 10. The alkyl group is preferably a linear or branched hydrocarbon group and more preferably a branched hydrocarbon group.

Typical examples of the compounds (a3) include 2-ethylhexyl(meth)acrylate, n-octyl(meth)acrylate, t-octyl(meth)acrylate, n-dodecyl(meth)acrylate, n-octadecyl acrylate, nonyl(meth)acrylate, isononyl(meth)acrylate, decyl(meth)acrylate, isodecyl(meth)acrylate, and the like. In particular, 2-ethylhexyl(meth)acrylate is preferable.

The compounds (a3) exemplified above may be used alone or as a mixture of two or more.

The content of the compound (a3) is preferably 10 to 98 mass %, more preferably 60 to 90 mass %, and particularly preferably 70 to 90 mass %, based on the total amount of the raw material monomers.

The compound (a) may contain additionally an ethylenic unsaturated carboxylic ester compound having "an alkyl group having 1 to 7 carbon atoms" in the alcohol region (a4). The compound (a4) is, for example, a (meth)acrylic ester having a 1- to 7-carbon alkyl group in the alcohol region. The example thereof is one or more compounds selected from methyl(meth)acrylate, ethyl(meth)acrylate, propyl(meth)acrylate, butyl(meth)acrylate, pentyl(meth)acrylate, hexyl(meth)acrylate, heptyl(meth)acrylate, and the like.

The alkyl group is preferably a linear or branched hydrocarbon group and more preferably a linear hydrocarbon group. The number of the carbons in the alkyl group is preferably 1 to 3. The ethylenic unsaturated carboxylic acid region is preferably methacrylic acid. In particular, methyl methacrylate is preferable.

The content of the compound (a4) is preferably 1 to 30 mass % and more preferably 2 to 25 mass %, based on the total amount of the raw material monomers.

The ethylenic unsaturated sulfonic acid compound (b) is, for example, one or more compounds selected from vinylsulfonic acid, p-styrenesulfonic acid, (meth)allylsulfonic acid, polyoxyethylene-1-allyloxymethyl alkylsulfonate esters, polyoxyalkylene alkenylether sulfonate esters, polyoxyethylene allyloxymethyl alkoxyethylsulfonate esters, alkyl allyl sulfosuccinates, and polyoxyalkylene(meth)acrylate sulfonate esters, or a salts thereof. The salt is for example, an alkali-metal salt (e.g., Na or K), an alkali-earth metal salt, an ammonium salt, or the like.

In particular, p-styrenesulfonic acid, polyoxyethylene-1-allyloxymethyl alkylsulfonate esters, polyoxyalkylene alkenylether sulfonate esters, polyoxyethylene allyloxymethyl alkoxyethylsulfonate esters, and the salts thereof are preferable, and polyoxyethylene-1-allyloxymethyl alkylsulfonate esters and the salts thereof are more preferable.

These compounds may be used alone or in combination of two or more.

The total content of the compounds (a) and (b) is preferably 70 mass % or more and more preferably 90 mass % or more, based on the total amount of the raw material monomers. When the content is in the range above, the binder composition according to the present invention can be used as a slurry for secondary battery electrodes.

The composition may contain an ethylenic unsaturated carboxylic acid (c) in addition to the compounds (a) and (b) and examples thereof include (meth)acrylic acid, (meth)allylic acid, and the like.

The content of the compound (c) is preferably 0.1 to 1.0 mass %, more preferably 0.1 to 0.9 mass %, and particularly preferably 0.3 to 0.9 mass %, based on the total amount of the raw material monomers. When the content is low, as in the range above, the electrode material slurry containing the binder composition according to the present invention is superior in storage stability and thus gives, when used, a coated film superior in smoothness. For that reason, the binder composition according to the present invention is favorable as an electrode material slurry.

The binder composition according to the present invention may contain, in addition to the compounds (a) to (c), one or more monomeric raw materials selected from olefinic compounds such as ethylene, vinyl ester compounds such as vinyl acetate, aromatic hydrocarbon compounds such as styrene, conjugated diene compounds such as butadiene and isoprene, and the like.

(2) Polymer Emulsion

The method for producing the polymer emulsion is not particularly limited, and it can be prepared by a method known in the art such as emulsion polymerization, suspension polymerization, or emulsified dispersion polymerization. Additives such as polymerization initiators, molecular weight adjusters, and emulsifiers may be used for polymerization of the monomers above and for preparation of the polymer emulsion according to the present invention.

Among the polymerization methods above, the emulsion polymerization method gives the polymer emulsion according to the present invention easily. In particular, emulsion polymerization by an emulsion-dropping method of mixing and dispersing monomers, water, and part of the emulsifier in advance and adding the mixture dropwise during polymerization is effective in giving a polymer emulsion with favorable properties.

The pH of the polymer emulsion is preferably in the range of 5 to 10, more preferably of 5 to 9, from the points of the corrosion resistance of current collector metal and the dispersion stability of active materials. The pH may be adjusted by addition of a basic aqueous solution containing ammonia, an alkali metal hydroxide, or the like. Examples of the alkali metal hydroxides include sodium hydroxide, potassium hydroxide, and the like.

(3) Polymer Particles

The polymer particles for use in the present invention comprises (a) an ethylenic unsaturated carboxylic ester compound and (b) an ethylenic unsaturated sulfonic acid compound at a (a)/(b) mass ratio of (98 to 91)/(2 to 9) in a total amount of (a) and (b) of 70 mass % or more, preferably 90 mass % or more, based on the monomeric raw materials.

The binder composition according to the present invention may comprise additionally a polymer and polymer particles other than the polymer particles above and also additives such as viscosity improvers and fluidizing agents.

The binder composition according to the present invention is a polymer emulsion containing the polymer particles dispersed in water and the content of the polymer particles in the composition is preferably 0.2 to 80 mass %, more preferably 0.5 to 70 mass %, and still more preferably 20 to 60 mass %.

The aqueous binder composition according to the present invention gives, when used, an electrode material slurry superior in storage stability and gives a coated film superior in smoothness on the current collector. It is possible, by using an electrode material slurry containing the binder composition according to the present invention, to produce an electrode superior in adhesiveness between the current collector and the active material and also in the pencil hardness of the film. The electrode also gives, when used in secondary battery or capacitor, a secondary battery or a capacitor superior in discharge rate and cycle characteristics.

2. Electrode Material Slurry According to the Invention

The electrode material slurry according to the present invention is prepared from the binder composition according to the present technology described above. The electrode material slurry can be prepared by mixing active materials, additives, and others. The electrode material slurry according to the present invention is preferably used for preparation of electrodes for use in lithium-ion secondary batteries, nickel-hydrogen secondary batteries, electric double-layer capacitors, and others and particularly preferably for preparation of electrodes for use in lithium-ion secondary batteries.

(1) Active Material

The active material for use may be any compound, if it is a material used in common secondary batteries and capacitors.

The positive-electrode active material is for example a compound represented by the following General Formula: AaMmZzOoNnFf (wherein A represents an alkali metal element; M represents a transition metal element (Fe, Mn, V, Ti, Mo, W, or Zn) or a composite thereof; Z represents a nonmetal atom (P, S, Se, As, Si, Ge, or B); O represents an oxygen atom; N represents a nitrogen atom; F represents a fluorine atom; a, m, z, n, and f are ≥0; and o is >0).

Examples of the positive-electrode active materials for lithium-ion secondary batteries include mixed lithium metal oxides mainly containing $Li_xMetO_2$. In the formula above, Met represents one or more transition metals, for example, one or more metals selected from cobalt, nickel, manganese, and iron, and x is normally in the range of $0.05 \leq x \leq 1.0$. Typical examples of the mixed lithium metal oxides include $LiCoO_2$, $LiNiO_2$, $LiMn_2O_4$, $LiFeO_2$, and the like.

Other examples include known positive-electrode active materials including olivine-type lithium iron phosphate ($LiFePO_4$); olivine-type lithium compounds such as olivine-type lithium phosphate compounds represented by $LiMetPO_4$ (Met=V, Fe, Ni, Mn); lithium-free metal sulfides and oxides such as $TiS_2$, $MoS_2$, $NbS_2$, and $V_2O_5$; and composite metals such as $NbSe_2$ and the like. Among these positive-electrode active materials, $LiFePO_4$ is particularly favorable for the binder composition according to the present technology.

The negative-electrode active material for lithium-ion secondary batteries is, for example, one or more compounds selected from lithium metal, alloys of Li with a low-melting-point metal such as Pb, Bi, or Sn, lithium alloys such as Li—Al alloy, carbonaceous materials, and others. The carbonaceous negative-electrode active material may be any compound, if it is a substance that can store and release the lithium ions responsible for battery operation. Carbonaceous compounds such as graphitizable carbon, non-graphitizable carbon, polyacene, and polyacetylene and acene-structure-containing aromatic hydrocarbon compounds such as pyrene and perylene are used favorably. Various carbonaceous materials can be used. In addition, lithium titanates represented by $Li_xTi_yO_z$ and metal oxide compounds such as $SiO_x$ and $SnO_x$ can also be used.

Examples of the positive-electrode active materials for nickel-hydrogen secondary batteries include nickel hydroxide and the like. Examples of the negative-electrode active materials for nickel-hydrogen secondary batteries include hydrogen-absorbing alloys. Examples of the positive- and negative-electrode active materials for electric double-layer capacitors include activated carbon and the like.

The amount of the binder composition according to the present technology in the electrode material slurry according to the present invention is preferably 0.1 to 10 parts by mass with respect to 100 parts by mass of the active material. When the binder amount is 0.1 part by mass or more, the active material such as $LiFePO_4$ is dispersed more easily and uniformly in the coating solution and gives a dry coated film with favorable strength after the coating step. Alternatively when the binder amount is not more than 10 parts by mass, it is possible to suppress decease of the amount of the active material in the positive electrode and thus to prevent reduction of the charge capacity.

(2) Conductive Assistant

The electrode material slurry according to the present invention may contain, as needed, a conductive assistant or the like.

Examples of the conductive assistants include carbon blacks such as acetylene black, Ketjen black, channel black, furnace black, lamp black, and thermal black, as well as carbon nanotubes, graphite powders, and various graphites. These assistants can be used alone or in combination of two or more.

(3) Composite Material

The electrode material slurry according to the present invention may contain a composite material of multiple conductive assistants and active materials that are connected to each other for improvement of the conductivity-providing efficiency and conductivity of the conductive assistants and active materials. In the case of an electrode material slurry for lithium-ion secondary batteries, examples of the composites include carbon black composites of fibrous carbon with carbon black, those additionally complexed and integrated with carbon-coated olivine-type lithium iron phosphate, and the like. The carbon black composites of fibrous carbon and carbon black are prepared, for example, by baking a mixture of fibrous carbon and carbon black. Alternatively, a mixture of the carbon black composite and a positive-electrode active material such as olivine-type lithium iron phosphate may be baked, to give a composite material.

Although it has been difficult to obtain an aqueous electrode material slurry with favorable properties generally because of a problem in dispersibility, it is possible by using the binder composition according to the present technology to obtain a favorable electrode material slurry.

(4) Additives

The electrode material slurry according to the present invention may contain, as needed, additives such as viscosity improvers and fluidizing agents added thereto.

Examples of the additives include water-soluble polymers such as polyvinylalcohol, carboxymethylcellulose, methylcellulose, polymethacrylic acid, and the like.

3. Electrode

The electrode according to the present invention is prepared by using the electrode material slurry according to the present technology. Specifically, the electrode according to the present invention can be prepared by coating and drying the electrode material slurry according to the present technology on a current collector and thus forming an electrode mixture layer thereon. The positive electrode is prepared with an electrode material slurry containing the positive-electrode active material, while the negative electrode with an electrode material slurry containing the negative-electrode active material. The electrode according to the present invention is preferably used in production of lithium-ion secondary batteries, nickel-hydrogen secondary batteries, and electric double-layer capacitors, particularly preferably in production of lithium-ion secondary batteries.

(1) Current Collector

Normally, aluminum is used favorably as the positive-electrode current collector. Normally, copper or aluminum is used favorably as the negative-electrode current collector. The shape of the current collector is not particularly limited and may be, for example, foil, mesh, expand metal, or the like. The shape of the current collector is preferably that with larger aperture area, such as mesh or expand metal, for retention of the electrolyte solution thereon after application. The thickness of the current collector is preferably about 0.001 to 0.03 mm.

(2) Method for Producing Electrode

The electrode material slurry can be applied by a common method. Examples of the application methods include reverse roll method, direct roll method, blade method, knife method, extrusion method, curtain method, gravure method, bar method, dip method, and squeeze method. Among the methods above, blade method (comma roll or die-cut), knife method, and extrusion method are preferable. It is possible to obtain a coated film with favorable surface state, by selecting then a suitable application method according to the solution physical properties and the drying efficiency of the binder. The binder may be coated on one or both faces and, if coated on both faces, the coating may be carried out stepwise or simultaneously. The coating may be carried out continuously, intermittent, or in stripe. The thickness and the length of the coated film of the electrode material slurry can be determined arbitrarily according to the size of the desired battery. For example, the thickness of the electrode material slurry coated, i.e., the thickness of the mixture layer, may be in the range of 10 μm to 500 μm.

The electrode material slurry can be dried by any method commonly practiced. In particular, it is preferable to use hot air, vacuum, infrared ray, far-infrared ray, electron beam, or low-temperature wind alone or in combination. As the electrode material slurry is prepared using water as the solvent in the present invention, it is possible to dry the slurry at a temperature of about 50 to 130° C. and thus to reduce the energy needed for drying.

The electrode may be pressed, as needed. The press may be carried out by a method commonly practiced, but in particular, mold press method and calendering-press method (cold or hot roll) are preferable. The press pressure is not particularly limited, but preferably 0.2 to 3 t/cm².

4. Secondary Battery and Capacitor

The secondary battery and the capacitor according to the present invention are prepared using the electrode according to the present technology. Examples of the secondary batteries include lithium-ion secondary batteries, nickel metal-hydrogen secondary batteries, and the like, and examples of the capacitors include electric double-layer capacitors and the like. In particular, the electrode according to the present technology is particularly preferably used in lithium-ion secondary batteries. The secondary battery and the capacitor according to the present invention preferably comprises the electrodes according to the present invention (positive and negative electrodes), a separator, and an electrolyte-containing solution (hereinafter, referred to simply as "electrolyte solution"). The positive or negative electrode according to the present invention may be used in combination with an electrode outside the technical scope of the present invention.

(1) Separator

The separator for use may be any material with sufficient strength, such as an electrically insulating porous film, a net, or a nonwoven fabric. In particular, the separator for use is preferably less resistant to ionic movement of the electrolyte solution and superior in retaining the solution. The material for the separator is not particularly limited, but examples thereof include inorganic and organic fibers such as glass fibers, synthetic resins such as polyethylene, polypropylene, polyester, polytetrafluoroethylene, and polyflon, the multilayer composites thereof, and the like. A film-shaped article of polyethylene or polypropylene or a multi-layer composite film thereof is desirable from the viewpoints of adhesiveness and stability.

(2) Electrolyte Solution

The electrolyte solution for use in lithium-ion secondary batteries is preferably a nonaqueous solution-based solvent, such as an organic solvent, containing a lithium salt as supporting electrolyte (hereinafter, referred to simply as "electrolyte"). The electrolyte contained in such an electrolyte solution may be any known lithium salt and examples thereof include, but are not limited to, $LiClO_4$, $LiBF_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, LiCl, LiBr, LiI, $LiB(C_2H_5)_4$, $LiCF_3SO_3$, $LiCH_3SO_3$, $LiCF_3SO_3$, $LiC_4F_9SO_3$, $LiN(CF_3SO_2)_2$, $LiN(C_2F_5SO_2)_2$, $LiC(CF_3SO_2)_3$, lithium salts of lower fatty carboxylic acids, and the like.

The electrolyte solution for use in nickel metal-hydride batteries is, for example, an aqueous solution containing sodium hydroxide, lithium hydroxide, or potassium hydroxide as the electrolyte. The electrolyte solution for use in electric double-layer capacitors contains a nonaqueous solution-based solvent, such as an organic solvent, containing an electrolyte such as an ammonium salt or a sulfonium salt. The organic solvent used in such cases may be a solvent or a solvent mixture of one or more of carbonates, alcohols, nitriles, amides, ethers, and others.

The organic solvent for the electrolyte used in the lithium-ion secondary batteries may be a solvent or a solvent mixture of one or more of carbonates, lactones such as γ-butyrolactone, ethers, sulfoxides such as dimethylsulfoxide, oxolanes, nitrogen-containing compounds, esters, inorganic esters, amides, glymes, ketones, sulfolanes such as sulfolane, oxazolidinones such as 3-methyl-2-oxazolidinone, sultones, and the like. Typical examples of the carbonates include propylene carbonate, ethylene carbonate, butylene carbonate, dimethyl carbonate, diethyl carbonate, methyl ethyl carbonate, and the like.

Typical examples of the ethers include trimethoxymethane, 1,2-dimethoxyethane, diethyl ether, 2-ethoxyethane, tetrahydrofuran, 2-methyltetrahydrofuran, and the like.

Typical examples of the oxolanes include 1,3-dioxolane, 4-methyl-1,3-dioxolane, and the like.

Examples of the nitrogen-containing compounds include acetonitrile, nitromethane, N-methyl-2-pyrrolidone, and the like.

Examples of the esters include methyl formate, methyl acetate, ethyl acetate, butyl acetate, methyl propionate, ethyl propionate, phosphate triesters, and the like.

Examples of the inorganic esters include sulfate esters, nitrate esters, acid chlorides esters, and the like.

Examples of the amides include dimethylformamide, dimethylacetamide, and the like.

Examples of the glymes include diglyme, triglyme, tetraglyme, and the like.

Examples of the ketones include acetone, diethyl ketone, methyl ethyl ketone, methyl isobutyl ketone, and the like.

Examples of the sultones include 1,3-propanesultone, 4-butanesultone, naphthasultone, and the like.

In the case of a lithium-ion secondary battery, the non-aqueous electrolyte solution is preferably a non-aqueous electrolyte solution of $LiPF_6$ dissolved in a carbonate solvent, and the concentration of the electrolyte may vary according to the electrode and the electrolyte solution used, but is preferably 0.5 to 3 mole/l.

EXAMPLES

Hereinafter, the present invention will be described more specifically with reference to Examples and Comparative Examples, but it should be understood that the present invention is not limited thereto.

Example 1

(1) Preparation of Polymer Emulsion

84 Parts by mass (hereinafter, referred to simply as "parts") of 2-ethylhexyl acrylate as (a3), 5 parts of methyl methacrylate as (a4), 5 parts of 2-hydroxyethyl methacrylate as (a1), 0.8 part of methacrylic acid as (c), 2 parts of ethylene glycol dimethacrylate as (a2), 3 parts of polyoxyethylene-1-(allyloxymethyl)alkylsulfonate ester ammonium salt ("Aqualon KH-10", produced by Dai-ichi Kogyo Seiyaku Co., Ltd., the same applies hereinafter) as (b) and 100 parts of water were placed in a temperature-adjustable container equipped with a stirrer and the mixture was polymerized with 0.2 part of ammonium persulfate at 80° C. for 6 hours. The polymerization conversion rate was 99%. The mixture was neutralized with aqueous 10% potassium hydroxide solution to pH 7, to give a polymer emulsion having a solid matter content of 50 mass %. In other words, the polymer emulsion contained polymer particles in an amount of 50 mass %.

(2) Preparation of Positive-electrode Material Slurry

5 Parts as solid matter of the polymer emulsion (binder composition) above, 2 parts of carboxymethylcellulose, 84 parts of $LiFePO_4$, 7 parts of acetylene black, and 2 parts of fibrous carbon were mixed, to give a positive-electrode material slurry having a solid matter content of 42%.

(3) Evaluation of Positive-electrode Material Slurry (A) Evaluation of Slurry's Storage Stability The positive-electrode material slurry prepared was stored still, as the container was sealed, and the properties of the slurry were examined after 1 week. The slurry was examined visually and a slurry with gelation, coarse particles, or significant change in viscosity was rated as "unfavorable"; that with favorable properties, without coarse particles, and also without significant change in viscosity change was rated as "favorable"; and that with some change in viscosity, but without coarse particles was rated as "good".

(B) Evaluation of the Smoothness of Coated Film

The positive-electrode material slurry prepared was coated on a positive-electrode current collector (aluminum foil) to a thickness of 200 μm. The coated film was visually examined and a coated film with streaks of coarse particles on the coated surface was rated as "unfavorable"; that without the streaks as "favorable"; and that with some streaks as "good."

(4) Preparation of Positive Electrode

The positive-electrode material slurry prepared was then coated on both faces of a positive-electrode current collector (aluminum foil) having a thickness of 20 μm to a slurry-coating amount of 140 $g/m^2$ on each face and the coated film was dried to form a positive-electrode mixture layer. The sheet was pressed by a roll pressing machine to a positive-electrode mixture layer thickness of 148 μm on both faces and cut to a width of 54 mm, to give stripe-shaped electrode-coated sheets. An aluminum current collector tab was connected to the terminal of the electrode-coated sheet by fusion under ultrasonication. The resulting sheet was dried under vacuum at 120° C. for 14 hours for complete removal of volatile components such as residual solvent and adsorbed water, to give a positive electrode. The adhesiveness of the positive-electrode mixture layer and the pencil hardness of the positive electrode prepared were evaluated according to the following methods:

(5) Evaluation of Positive Electrode (C) Evaluation of Adhesiveness

The adhesiveness between the current collector and the positive-electrode active material was evaluated according to the crosscut test of JIS K-5600-5-6, using a 25-square grid pattern with a square width of 2 mm formed on the positive electrode prepared. The results are rated on six stages as 0 to 5 and a smaller number indicates higher adhesiveness.

(D) Evaluation of Pencil Hardness

The pencil hardness was determined, using the positive electrode prepared, according to the scratch hardness (pencil test) of JIS K-5600-5-4. The results are rated on 14 stages as 6B to 6H.

(6) Preparation of Negative Electrode

Subsequently, 98 parts of graphite, 1 part as solid matter of the polymer emulsion prepared (binder composition), and 1 part of carboxymethylcellulose were mixed as negative-electrode active material and the mixture was kneaded, as water was added thereto as needed, to give a negative-electrode material slurry.

The negative-electrode material slurry was coated on both faces of a negative-electrode current collector (copper foil) having a thickness of 10 μm to a slurry-coating amount of 70 $g/m^2$ on each face and the wet sheet was dried to form a negative-electrode mixture layer. The sheet was then pressed by a roll pressing machine to a negative-electrode mixture layer thickness of 90 μm on both faces of the negative-electrode current collector and cut to a width of 56 mm, to give a rectangular electrode-coated sheet. A nickel current collector tab was connected to the terminal of the electrode-coated sheet by fusion under ultrasonication, and the resulting sheet was dried under vacuum at 120° C. for 14 hours for complete removal of volatile components, such as residual solvent and adsorbed water, to give a negative electrode.

(7) Preparation of Lithium-ion Secondary Battery

The positive and negative electrodes thus obtained were wound with a microporous polyethylene film separator having a thickness of 25 μm and a width of 60 mm placed between them, to give a spiral roll. The roll was placed in a battery container, and then, a nonaqueous electrolyte solution (ethylene carbonate/methyl ethyl carbonate liquid mixture: 30/70 (mass ratio)) was injected into the battery container in an amount of 5 ml and the container was closed and sealed, to give a cylindrical lithium secondary battery having a diameter of 18 mm and a height of 65 mm (3.4 V-940 mAh). The battery performance of the lithium-ion secondary battery prepared was evaluated by the following methods:

(8) Evaluation of Lithium-ion Secondary Battery

The lithium-ion secondary battery prepared was charged at 25° C. under a constant current and a constant voltage of 0.2 ItA (188 mA) and 4.0 V and discharged under a constant current of 0.2 ItA to 2.0 V.

(E) Evaluation of Discharge Rate Characteristics (Capacity Retention Rate)

Then, the discharge capacity at a discharge current was determined, as the discharge current was changed from 0.2 ItA to 1 ItA. The recovery charging after each measurement was carried out under constant current and constant voltage (1 ItA and 4.0 V). The retention rate of the high-speed discharge capacity when discharged at 1 ItA, as compared with that when discharged at 0.2 ItA was calculated.

(F) Evaluation of Cycle Characteristics (Capacity Retention Rate)

A battery was subjected to charging under a constant current of 1 ItA and a constant charge voltage of 4.0 V and discharging under a constant current of 1 ItA to a final discharge voltage of 2.0 V at an ambient temperature of 25° C. The cycle of charging and discharging was repeated, and the ratio of the discharge capacity in the 500th cycle to that of the 1st cycle was determined and used as the cycle capacity retention rate.

The test results are summarized in "Table 1."

Example 2

The polymer emulsion (binder composition) of Example 2 was prepared and evaluated in a manner similar to Example 1, except that the polymer composition of the polymer emulsion (binder composition) of Example 1 was changed to 83 parts of 2-ethylhexyl acrylate as (a3), 5 parts of methyl methacrylate as (a4), 5 parts of 2-hydroxyethyl methacrylate as (a1), 0.8 part of methacrylic acid as (c), 2 parts of ethylene glycol dimethacrylate as (a2), and 4 parts of a polyoxyethylene-1-(allyloxymethyl)alkylsulfonate ester ammonium salt as (b). In addition, an electrode material slurry and a lithium-ion secondary battery were prepared and evaluated in a manner similar to Example 1, using the polymer emulsion prepared. The same shall apply also to the following Examples 3 to 9.

Example 3

The polymer emulsion (binder composition) of Example 3 was prepared and evaluated in a manner similar to Example 1, except that the polymer composition of the polymer emulsion (binder composition) of Example 1 was changed to 87 parts of 2-ethylhexyl methacrylate as (a3), 5 parts of 2-hydroxyethyl methacrylate as (a1), 0.8 part of methacrylic acid as (c), 2 parts of allyl methacrylate as (a2), and 5 parts of a polyoxyalkylene alkenylethersulfonate ester ammonium salt ("LATEMUL PD-104," produced by Kao Corp.) as (b).

Example 4

The polymer emulsion (binder composition) of Example 4 was prepared and evaluated in a manner similar to Example 1, except that the polymer composition of the polymer emulsion (binder composition) of Example 1 was changed to 85 parts of 2-ethylhexyl acrylate as (a3), 5 parts of methyl methacrylate as (a4), 5 parts of 2-hydroxyethyl methacrylate as (a1), 0.8 part of methacrylic acid as (c), 2 parts of ethylene glycol dimethacrylate as (a2), and 1.5 parts of a polyoxyethylene-1-(allyloxymethyl)alkylsulfonate ester ammonium salt and 1 part of sodium p-styrenesulfonate as (b).

Example 5

The polymer emulsion (binder composition) of Example 5 was prepared and evaluated in a manner similar to Example 1, except that the polymer composition of the polymer emulsion (binder composition) of Example 1 was changed to 84 parts of 2-ethylhexyl acrylate as (a3), 5 parts of methyl methacrylate as (a4), 5 parts of 2-hydroxyethyl methacrylate as (a1), 0.8 part of methacrylic acid as (c), 2 parts of ethylene glycol dimethacrylate as (a2), and 1.5 parts of a polyoxyethylene-1-(allyloxymethyl)alkylsulfonate ester ammonium salt and 2 parts of sodium p-styrenesulfonate as (b).

Example 6

The polymer emulsion (binder composition) of Example 6 was prepared and evaluated in a manner similar to Example 1, except that the polymer composition of the polymer emulsion (binder composition) of Example 1 was changed to 38 parts of 2-ethylhexyl acrylate and 50 parts of 2-ethylhexyl methacrylate as (a3), 5 parts of 2-hydroxyethyl methacrylate as (a1), 0.8 part of methacrylic acid as (c), 2 parts of ethylene glycol dimethacrylate as (a2), and 4 parts of a polyoxyethylene-1-(allyloxymethyl)alkylsulfonate ester ammonium salt as (b).

Example 7

The polymer emulsion (binder composition) of Example 7 was prepared and evaluated in a manner similar to Example 1, except that the polymer composition of the polymer emulsion (binder composition) of Example 1 was changed to 76 parts of 2-ethylhexyl acrylate as (a3), 5 parts of methyl methacrylate as (a4), 5 parts of 4-hydroxybutyl acrylate as (a1), 0.8 part of methacrylic acid as (c), 10 parts of ethylene glycol dimethacrylate as (a2), and 3 parts of a polyoxyethylene allyloxymethyl alkoxyethylsulfonate ester ammonium salt ("ADEKA REASOAP SR-10," produced by ADEKA) as (b).

Example 8

The polymer emulsion (binder composition) of Example 8 was prepared and evaluated in a manner similar to Example 1, except that the polymer composition of the polymer emulsion (binder composition) of Example 1 was changed to 83 parts of 2-ethylhexyl acrylate as (a3), 5 parts of methyl methacrylate as (a4), 5 parts of 2-hydroxyethyl methacrylate as (a1), 2 parts of methacrylic acid as (c), 2 parts of ethylene glycol dimethacrylate as (a2), and 3 parts of a polyoxyethylene-1-(allyloxymethyl)alkylsulfonate ester ammonium salt as (b).

Example 9

The polymer emulsion (binder composition) of Example 9 was prepared and evaluated in a manner similar to Example 1, except that the polymer composition of the polymer emulsion (binder composition) of Example 1 was changed to 5 parts of methyl methacrylate and 84 parts of butyl acrylate as (a4), 5 parts of 2-hydroxyethyl methacrylate as (a1), 0.8 part of methacrylic acid as (c), 2 parts of ethylene glycol dimethacrylate as (a2), and 3 parts of a polyoxyethylene-1-(allyloxymethyl)alkylsulfonate ester ammonium salt as (b).

Comparative Example 1

The polymer emulsion (binder composition) of Comparative Example 1 was prepared and evaluated in a manner similar to Example 1, except that the polymer composition of the polymer emulsion (binder composition) of Example 1 was changed to 89 parts of 2-ethylhexyl acrylate as (a3), 5 parts of methyl methacrylate as (a4), 5 parts of 2-hydroxyethyl methacrylate as (a1), 0.1 part of methacrylic acid as (c), 0.1 part of allyl methacrylate as (a2), and 1.5 parts of polyoxyethylene-1-(allyloxymethyl)alkylsulfonate ester ammonium salt as (b).

Comparative Example 2

The polymer emulsion (binder composition) of Comparative Example 2 was prepared and evaluated in a manner similar to Example 1, except that the polymer composition of the polymer emulsion (binder composition) of Example 1 was changed to 77 parts of 2-ethylhexyl acrylate as (a3), 5 parts of methyl methacrylate as (a4), 5 parts of 2-hydroxyethyl methacrylate as (a1), 0.8 part of methacrylic acid as (c), 2 parts of ethylene glycol dimethacrylate as (a2), and 10 parts of a polyoxyethylene-1-(allyloxymethyl)alkylsulfonate ester ammonium salt as (b).

The test results in Examples 2 to 9 and Comparative Example 1 and 2 are also summarized in "Table 1."

TABLE 1

| | Component | | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|---|---|
| Polymer composition (parts by mass) | 2-Ethylhexyl acrylate | a(a3) | 84 | 83 | | 85 | 84 | 38 | 76 | 83 | | 89 | 77 |
| | 2-Ethylhexyl methacrylate | | | | 87 | | | 50 | | | | | |
| | 2-Hydroxyethyl methacrylate | a(a1) | 5 | 5 | 5 | 5 | 5 | 5 | 5 | 5 | 5 | 5 | 5 |
| | 4-Hydroxybutyl acrylate | | | | | | | | | | | | |
| | Ethylene glycol dimethacrylate | a(a2) | 2 | 2 | | 2 | 2 | 2 | | 2 | 2 | 0.1 | 2 |
| | Allyl methacrylate | | | | 2 | | | | 5 | | | | |
| | Methyl methacrylate | a(a4) | 5 | 5 | | 5 | 5 | | 5 | 5 | 5 | 5 | 5 |
| | Butyl acrylate | | | | | | | | | | 84 | | |
| | Sodium p-styrenesulfonate | b | 3 | 4 | | 1 | 2 | 4 | | 3 | 3 | 1.5 | 10 |
| | Polyoxyethylene-1-(allyloxymethyl) alkylsulfonate ester ammonium salt | | | | 5 | 1.5 | 1.5 | | | | | | |
| | Polyoxyalkylene alkenylethersulfonate ester ammonium salt | | | | | | | | 3 | | | | |
| | Polyoxyethylene allyloxymethyl alkoxyethylsulfonate ester ammonium salt | | | | | | | | | | | | |
| Polymer composition (mass %) | Methacrylic acid | c | 0.8 | 0.8 | 0.8 | 0.8 | 0.8 | 0.8 | 0.8 | 0.8 | 0.8 | 0.1 | 0.8 |
| | Content of a1 in all monomers | | 5.0% | 5.0% | 5.0% | 5.0% | 5.0% | 5.0% | 5.0% | 5.0% | 5.0% | 5.0% | 5.0% |
| | Content of a2 in all monomers | | 2.0% | 2.0% | 2.0% | 2.0% | 2.0% | 2.0% | 10.0% | 2.0% | 2.0% | 0.1% | 2.0% |
| | Content of a3 in all monomers | | 84.2% | 83.2% | 87.2% | 84.7% | 83.7% | 88.2% | 76.2% | 83.0% | 0.0% | 88.4% | 77.2% |
| | Content of a4 in all monomers | | 5.0% | 5.0% | 0.0% | 5.0% | 5.0% | 0.0% | 5.0% | 5.0% | 89.2% | 5.0% | 5.0% |
| | Content of b in all monomers | | 3.0% | 4.0% | 5.0% | 2.5% | 3.5% | 4.0% | 3.0% | 2.0% | 3.0% | 1.5% | 10.0% |
| | Content of c in all monomers | | 0.8% | 0.8% | 0.8% | 0.8% | 0.8% | 0.8% | 0.8% | 2.0% | 0.8% | 0.1% | 0.8% |
| | Mass ratio of (a)/((a) + (b)) | | 97 | 96 | 95 | 97 | 96 | 96 | 97 | 97 | 97 | 99 | 90 |
| | Mass ratio of (b)/((a) + (b)) | | 3 | 4 | 5 | 3 | 4 | 4 | 3 | 3 | 3 | 1 | 10 |
| Test results | Total content of (a) and (b) in all monomers | % | 99.2% | 99.2% | 99.2% | 99.2% | 99.2% | 99.2% | 99.2% | 98.0% | 99.2% | 99.9% | 99.2% |
| | Slurry storage stability | | favorable | favorable | favorable | favorable | favorable | favorable | favorable | good | favorable | unfavorable | unfavorable |
| | Smoothness of coated film | | favorable | favorable | favorable | favorable | favorable | favorable | favorable | favorable | favorable | good | unfavorable |
| | Adhesiveness | | 2 | 0 | 1 | 2 | 2 | 1 | 2 | 2 | 2 | 5 | — |
| | Pencil hardness | | 5H | 5H | 6H | 5H | 4H | 6H | 4H | 4H | 4H | 6B | — |
| | Discharge rate characteristics (capacity retention rate) | % | 96 | 97 | 95 | 97 | 95 | 93 | 94 | 89 | 80 | 89 | — |
| | Cycle characteristics (capacity retention rate) | % | 94 | 95 | 91 | 94 | 92 | 90 | 91 | 88 | 70 | 80 | — |

Example 10 and Comparative Example 3

(Positive Electrode Containing $LiFePO_4$ Carbon Black Composite)

A composite powder of acetylene black (average primary particle diameter: 35 nm), carbon nanotube, and $LiFePO_4$ was prepared by sintering.

An electrode material slurry and a battery were prepared and evaluated in a manner similar to Example 1, except that: in preparation of the positive-electrode material slurry, the same amount (93 parts) of the olivine-type lithium iron phosphate-acetylene black-carbon nanotube complex prepared was used, replacing $LiFePO_4$ (84 parts), acetylene black (7 parts), and fibrous carbon (2 parts); and the polymer emulsion of Example 1 was used in Example 10 and the polymer emulsion of Comparative Example 1 was used in Comparative Example 3.

Comparative Example 4

A positive-electrode material slurry having a solid matter content of 47% was prepared as the same amount (90 parts) of the olivine-type lithium iron phosphate-acetylene black-carbon nanotube complex prepared was used, replacing $LiFePO_4$ (84 parts), acetylene black (7 parts), and fibrous carbon (2 parts) and 10 parts (as solid matter) of a solution containing PVDF as resin binder dissolved in NMP at 8% as was mixed. A battery was prepared and evaluated similarly to Example 1, except that the positive electrode material slurry above was used.

The test results are summarized in "Table 2."

TABLE 2

| | | | Example 10 | Comparative Example 3 | Comparative Example 4 |
|---|---|---|---|---|---|
| Binder composition species | | | Example 1 | Comparative Example 1 | PVDF |
| Test Results | Slurry storage stability | | favorable | unfavorable | good |
| | Smoothness of coated film | | favorable | unfavorable | favorable |
| | Adhesiveness | | 2 | — | 2 |
| | Pencil hardness | | 4H | — | 4H |
| | Discharge rate characteristics (capacity retention rate) | % | 99 | — | 94 |
| | Cycle characteristics (capacity retention rate) | % | 97 | — | 90 |

Table 1 shows that the electrode material slurries obtained from the lithium-ion secondary battery binder compositions for electrode in Examples of the present invention are superior in storage stability, give a favorable coated film on electrodes, and also a lithium-ion secondary batteries superior in discharge rate characteristics and cycle characteristics.

The results above were obtained, not only when the olivine-type lithium iron phosphate was used as the positive-electrode active material, but also when a manganese-based composite lithium oxide, a mixed cobalt oxide, or a nickel-based mixed oxide was used. The results of slurry storage stability, smoothness of coated film, adhesiveness, and pencil hardness were similar among the negative electrodes for lithium-ion secondary battery used in Examples above, the electrodes for nickel-hydrogen secondary batteries, and the electrodes for electric double-layer capacitors.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A binder composition for electrode, comprising polymer particles containing (a) an ethylenic unsaturated carboxylic ester compound and (b) an ethylenic unsaturated sulfonic acid compound at a (a)/(b) mass ratio of (98 to 91)/(2 to 9) in a total (a) and (b) amount of 70 mass % or more, based on the monomeric raw materials, wherein the ethylenic unsaturated carboxylic ester compound (a) contains an ethylenic unsaturated carboxylic ester compound having one or more hydroxyl groups in the alcohol region (a1) and the content of the compound (a1) is 1 to 9 mass % on the total amount of the raw monomers, and wherein the ethylenic unsaturated carboxylic ester compound (a) contains an ethylenic unsaturated carboxylic ester compound having multiple (meth)acrylic groups and/or (meth)allylic groups (a2) and the content of the compound (a2) is 1 to 10 mass % based on the total amount of the raw monomers.

2. The binder composition for electrode according to claim 1, wherein the ethylenic unsaturated carboxylic ester compound (a) contains additionally an ethylenic unsaturated carboxylic ester compound having an alkyl group having a carbon number of 8 or more in the alcohol region (a3) and the content of the compound (a3) is 10 to 90 mass % based on the total amount of the raw monomers.

3. The binder composition for electrode according to claim 2, wherein the ethylenic unsaturated carboxylic ester compound (a) contains additionally (a4) an ethylenic unsaturated carboxylic ester compound having an alkyl group having 1 to 7 carbon atoms in the alcohol region and the content of the (a4) is 1 to 30 mass %.

4. The binder composition for electrode according to claim 1, further comprising (c) an ethylenic unsaturated carboxylic acid, wherein the content of the ethylenic unsaturated carboxylic acid is 0.1 to 1.0 mass %.

5. An electrode material slurry, comprising the binder composition for electrode according to claim 1 and an active material.

6. An electrode produced by using the electrode material slurry according to claim 5.

7. A secondary battery produced by using the electrode according to claim 6.

8. An electric double-layer capacitor produced by using the electrode according to claim 6.

* * * * *